United States Patent
Lee et al.

(10) Patent No.: US 6,944,562 B2
(45) Date of Patent: Sep. 13, 2005

(54) TEMPERATURE COMPENSATION DEVICE AND METHOD WITH LOW HEAT-GENERATION

(75) Inventors: Jong-Hun Lee, Suwon-shi (KR); Tae-Sung Park, Suwon-shi (KR); Chan-Youl Kim, Puchon-shi (KR); Sung-Il Sohn, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 32 days.

(21) Appl. No.: 10/619,787

(22) Filed: Jul. 15, 2003

(65) Prior Publication Data

US 2004/0073394 A1 Apr. 15, 2004

(30) Foreign Application Priority Data

Aug. 9, 2002 (KR) .................. 10-2002-0047181

(51) Int. Cl.[7] .................. G01K 15/00; G01K 19/00; G06F 19/00
(52) U.S. Cl. .................. 702/99
(58) Field of Search .................. 702/99; 62/3.3, 62/208; 385/140; 372/20; 324/721

(56) References Cited

U.S. PATENT DOCUMENTS

| 5,205,132 | A | * | 4/1993 | Fu .................. 62/208 |
| 6,353,623 | B1 | * | 3/2002 | Munks et al. .................. 372/20 |
| 6,525,550 | B2 | * | 2/2003 | Pan .................. 324/721 |
| 6,681,073 | B2 | * | 1/2004 | Chan et al. .................. 385/140 |
| 2002/0121094 | A1 | * | 9/2002 | VanHoudt .................. 62/3.3 |

* cited by examiner

*Primary Examiner*—John Barlow
*Assistant Examiner*—Aditya Bhat
(74) *Attorney, Agent, or Firm*—Cha & Reiter, L.L.C.

(57) ABSTRACT

A temperature compensation device for an optical communication device or the like is constructed so that an error value, which is the difference between the current temperature and a reference temperature, is subjected to digital processing in a temperature comparison unit. A digital error voltage value is calculated and digital PID control is performed instead of analog PID which requires electric components such as a power op-amp, a resistor (R), and a capacitor (C). According to this construction it is possible to reduce the number of electric parts. It is also possible to accept various types of temperature sensors while using only one PCB regardless of the types of temperature sensors utilized.

11 Claims, 7 Drawing Sheets

TEMPERATURE COMPENSATION DEVICE AND METHOD WITH LOW HEAT-GENERATION

This application claims priority to an application entitled "TEMPERATURE COMPENSATION DEVICE AND METHOD WITH LOW HEAT-GENERATION," filed in the Korean Intellectual Property Office on Aug. 9, 2002 and assigned Ser. No. 2002-47181, the contents of which are hereby incorporated by reference.

BACKGROUND OF THE INVENTION

1. Field of the Invention

The present invention relates to a temperature compensation device and method which allows an optical communication device to have a constant temperature characteristic regardless of the change of environmental temperature, and in particular a low heat-generating temperature compensation device and method using a proportion-integration-derivation (PID) control circuit.

2. Description of the Related Art

An arrayed waveguide grating (AWG) is an optical communication device that is principally used as a multiplexer/demultiplexer (Mux/DeMux) for multiplexing or demultiplexing a multi-wavelength optical channel in an optical communication system in wavelength division multiplexing (WDM) mode. A problem with optical communication devices such as the AWG is that they are sensitive to environmental circumstances and may therefore cause performance of an optical communication system to deteriorate.

To overcome such a problem, a temperature compensation device is utilized to maintain a constant temperature characteristic in such optical communication devices regardless of change in environmental temperature. Such a temperature compensation device may be embodied principally through use of a PID control circuit.

Figure 1:
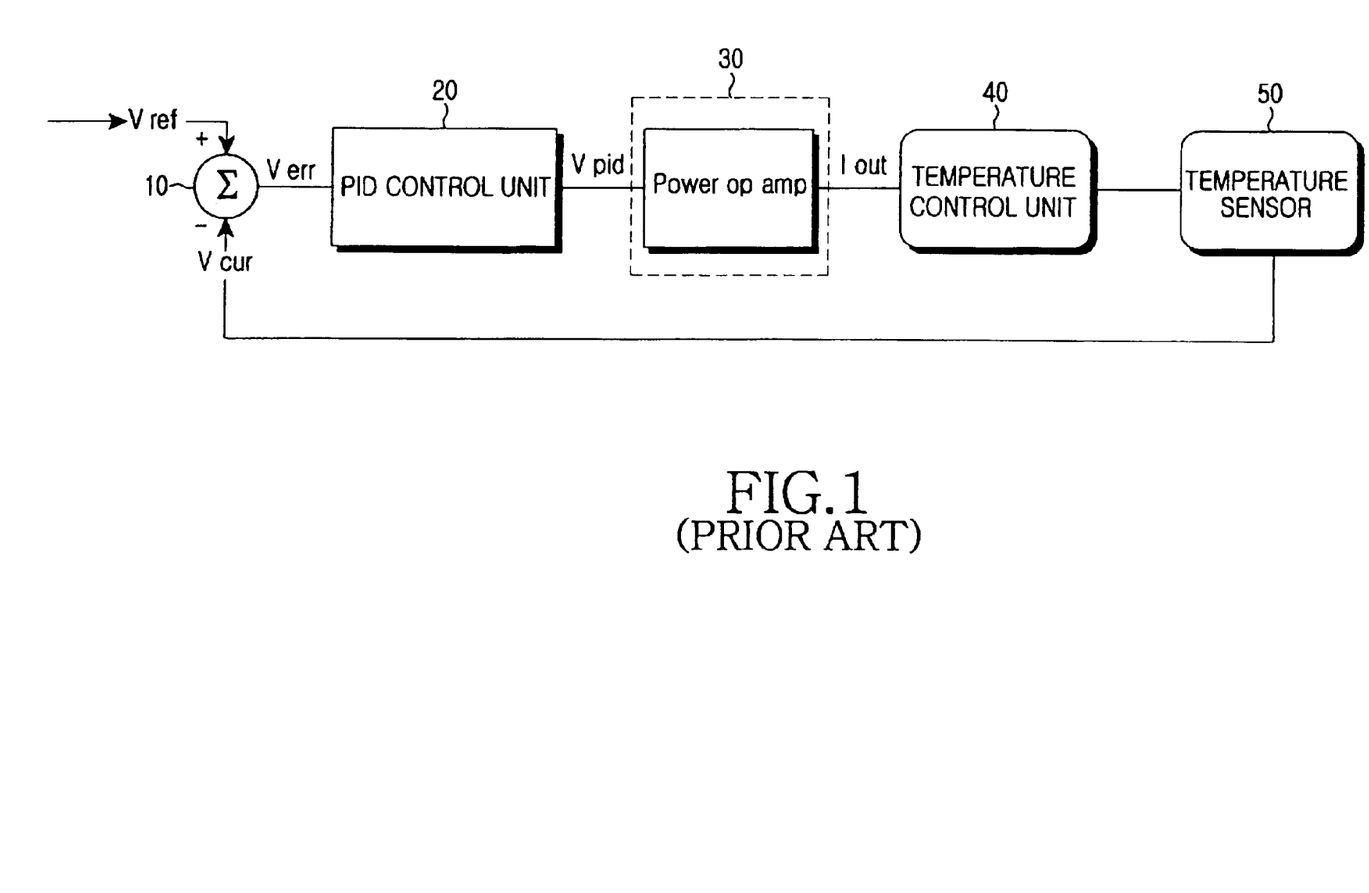
FIG. 1 is a block diagram illustrating a conventional temperature compensation device using a PID control circuit.

FIG. 1 is a block diagram illustrating a conventional temperature compensation device that uses a conventional PID control circuit.

As illustrated in FIG. 1, the conventional temperature compensation device comprises a temperature comparison unit 10, a PID control unit 20, a high electric current drive unit 30, a temperature control unit 40 and a temperature sensor 50.

The temperature comparison unit 10 compares a current voltage value $V_{cur}$ based on the current temperature with a reference temperature $V_{ref}$ to yield as a difference an error voltage value $V_{err}$. The reference voltage value $V_{ref}$ is set directly or through a digital-to-analog converter (DAC) fed by a universal micro controller. $V_{cur}$ is set by reading a resistance value of a temperature sensor attached to an optical communication device such as an AWG and converting the resistance value into the current voltage value $V_{cur}$.

The PID control unit 20 urges $V_{cur}$ into conformity with the actual present temperature by outputting a PID voltage value $V_{pid}$ to the high electric current drive unit 30. The PID control unit may incorporate a P control circuit, a PI control circuit, a PD control circuit, a PID control circuit or the like in accordance with the temperature variation characteristic of the optical communication device.

The high electric current drive unit 30 receives and amplifies $V_{pid}$ to derive a "high temperature" representative current $I_{out}$ which it then supplies to the temperature control device 40. As the high electric current drive unit, a power operational amplifier (op-amp) is generally used.

The temperature control device 40 uses $I_{out}$ to control the temperature of the optical communication device. Operationally, the polarity of $I_{out}$ is determined in the PID control unit 20 based on the polarity of the error voltage value $V_{err}$. If the error voltage value exhibits a positive value, positive electric current is supplied; whereas, if the error voltage value exhibits a negative value, negative electric current is supplied. Such a temperature control device uses a heater, thermal electric cooler (TEC), or the like. The heater functions to heat the optical communication device regardless of the polarity of $I_{out}$, and the TEC functions to heat or cool the optical communication device in accordance with the polarity of $I_{out}$.

The temperature sensor 50 functions to sense a temperature and is implemented, for example, as a thermistor or a resistive thermal detector (RTD). Respective characteristics of the thermistor and the RTD differ; the resistance of the latter increases with temperature, whereas the resistance of the former decreases as temperature increases.

Conventional temperature compensation devices having the aforementioned construction have several disadvantages. The power op-amp, which is used as the high electrical drive unit, has poor thermal efficiency and thus generates too much heat. Also, it almost invariably requires a heat sink, thereby increasing material costs and the volume of entire module.

In order to overcome these problems, a low heat-generating temperature compensation device which does not require a heat sink has been implemented by using a pulse width modulation (PWD) driver and a current rectifier circuit.

Figure 2:
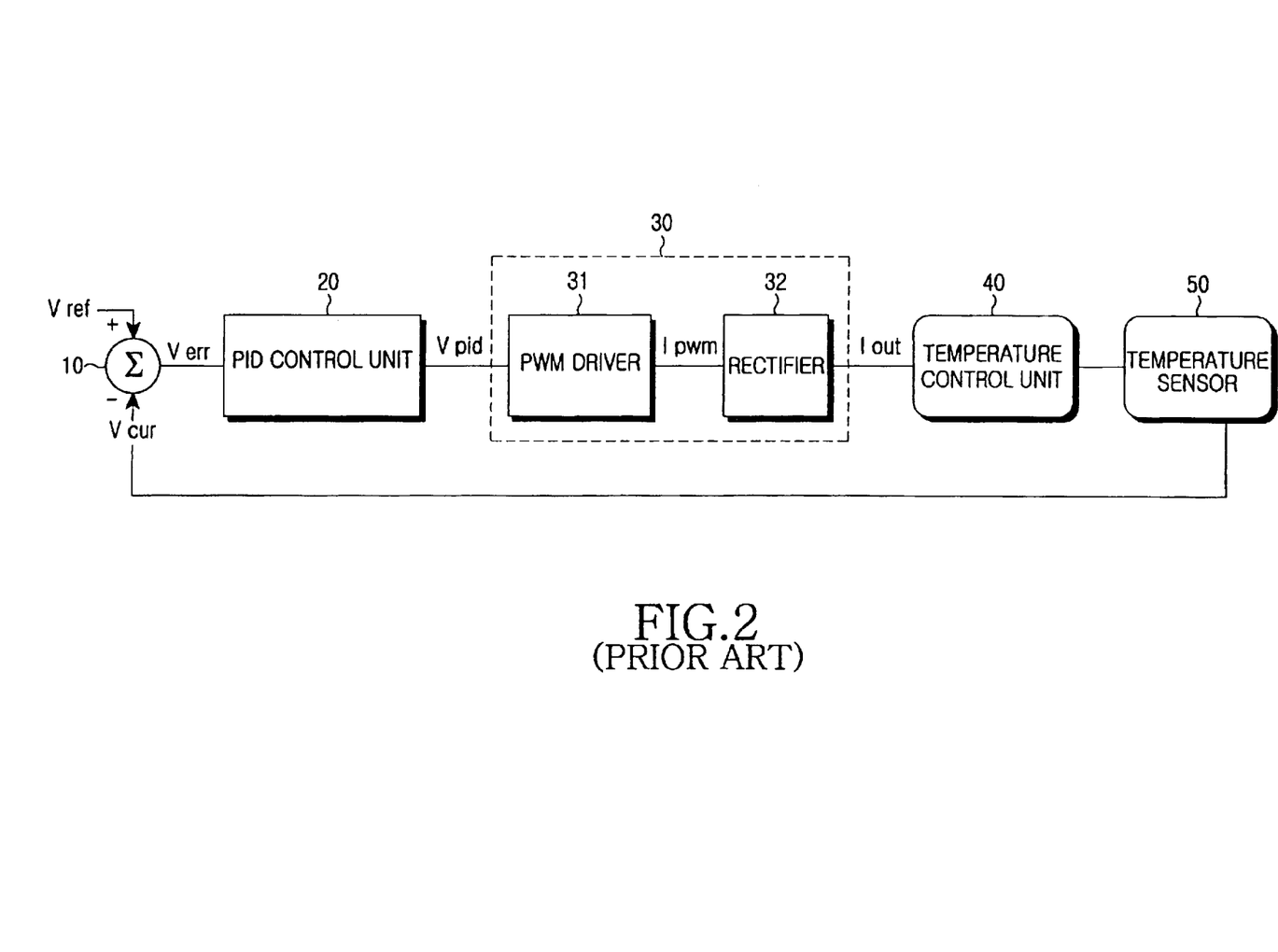
FIG. 2 is a block diagram illustrating a known low heat-generating temperature compensation device.

FIG. 2 is a block diagram illustrating a known low heat-generating temperature compensation device.

Figure 3A:
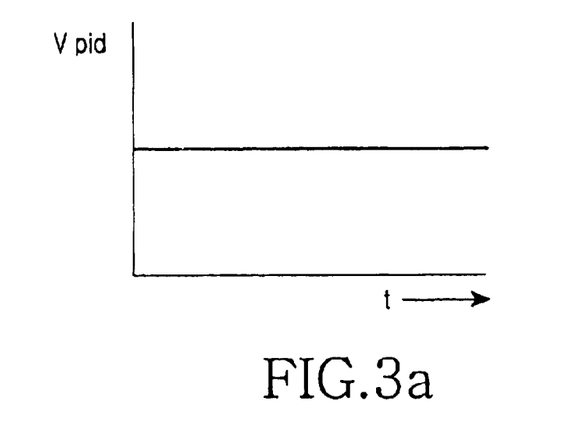
FIG. 3, *a* through *c*, is a graphical representation of signaling in the embodiment of FIG. 2.
Figure 3B:
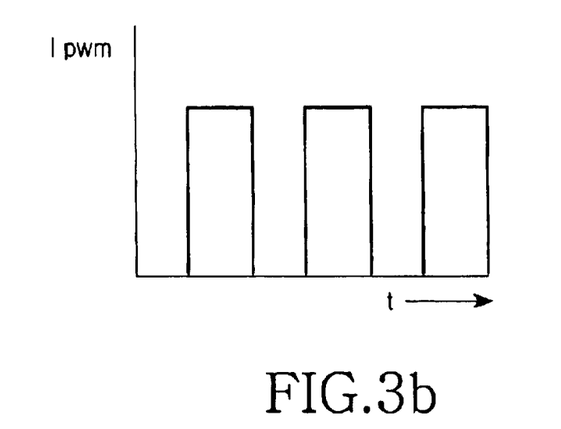
Figure 3C:
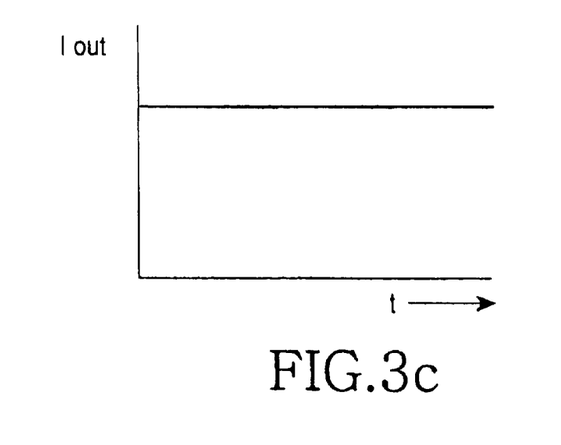

As illustrated in FIG. 2, the conventional low heat-generating temperature compensation device has a construction which is similar to that shown in FIG. 1, but a PWM driver 31 and a current rectifier circuit 32 substitute for the power op-amp. FIG. 3 illustrates the output characteristic of the high current drive unit 32 formed from the PWM driver 31 and the current rectifier circuit 32. The analog PID control unit 20 outputs a temperature compensation signal $V_{pid}$ based on the error voltage value $V_{err}$ (FIG. 3a). The PWM driver 31 amplifies $V_{pid}$ to yield an amplified signal $I_{pwm}$ (FIG. 3b). $I_{pwm}$ is passed through the current rectifier 32 and changed to a direct current (DC) signal $I_{out}$ (FIG. 3c).

However, the conventional temperature compensation device shown in FIG. 2 utilizes a proportioner (P), an integrator (I), a derivator (D) in a PID control circuit to maintain the error voltage $V_{err}$ at zero. The conventional device therefore requires the use of a vast number of electric components such as a high performance op-amp, a resistor (R) and a capacitor (C). Such an analog PID control circuit therefore entails increased material costs and volumetric enlargement of temperature compensation modules. Furthermore, the properties of the electric components abruptly grow worse under an extreme environment and thus the entire performance of the temperature compensation module is apt to deteriorate.

As mentioned above, the error voltage value $V_{err}$ in the temperature compensation unit is generally obtained by calculating the difference between the voltage value at the current temperature $V_{cur}$ and the voltage value at the reference temperature $V_{ref}$ using an instrument op-amp. In general, however, the polarity of $V_{err}$ is dependent upon the type of temperature sensor, e.g., thermistor or RTD, used in measuring the temperature. As described above, a polarity change in $V_{err}$ also changes the polarity of the electric current $I_{out}$ applied to a temperature control device such as a heater or a TEC, and, consequently, changes the functioning of the temperature control device which is applied to an optical communication device. A resulting disadvantage is that the printed circuit boards (PCB) that are selected to implement the temperature comparison unit vary with the type of temperature sensor employed.

SUMMARY OF THE INVENTION

The present invention has been made to solve the above-mentioned problems of the prior art, and an object of the present invention is to provide a low heat-generating temperature compensation device, which can be miniaturized in size and can be manufactured at reduced cost.

One aspect of the present invention is to provide a low heat-generating temperature compensation device and method that can accept various types of temperature sensors while using one and the same PCB regardless of the type of temperature sensor utilized.

According to another aspect of the invention, there is provided a low heat-generating temperature compensation device that allows an optical communication device to maintain a constant temperature characteristic regardless of change in environmental temperature, the low heat-generating temperature compensation device comprising: a temperature sensor that detects the temperature of the optical communication device when the device is in use; a temperature comparison unit that performs digital signal processing of a signal corresponding to the detected temperature and a signal corresponding to a reference temperature of the optical communication device and then generates a digital error value which is the difference between the two signals; a D/A converter which converts the digital error value of the temperature comparison unit into an analog signal; a temperature control unit that controls the temperature of the optical communication device on the basis of a temperature compensation signal; and an analog PID control unit that receives the analog signal and performs PID control using an analog method to generate the temperature compensation signal so as to urge the digital error value to zero.

In order to achieve the above objects, there is also provided a low heat-generating temperature compensation method, that allows an optical communication device to have a constant temperature characteristic regardless of change in environmental temperature, the low heat-generating temperature compensation method comprising the steps of: detecting the temperature of the optical communication device while in use; performing digital signal processing of a signal corresponding to the detected temperature and a signal corresponding to a reference temperature of the optical communication device and then generating a digital error value which is the difference between the two signals; converting the digital error value of the temperature comparison unit into an analog signal; performing, using an analog method, temperature compensation for the optical communication device based on a temperature compensation signal; and receiving the analog signal and performing PID control in an analog method to generate the temperature compensation signal so as to urge the digital error value to zero.

BRIEF DESCRIPTION OF THE DRAWINGS

The above and other features and advantages of the present invention will be more apparent from the following detailed description taken in conjunction with the accompanying drawings, in which identical components are indicated by identical reference numbers and symbols throughout the several views.

DETAILED DESCRIPTION OF THE PREFERRED EMBODIMENTS

In the present invention, a low heat-generating temperature compensation device for temperature compensation of an optical communication device or the like is constructed in such a manner that an error value which is the difference between the current temperature and a reference temperature is subjected to digital processing in a temperature comparison unit. The digital processing calculates a digital error voltage value, and digital PID control is performed in substitution for analogue PID which requires electric components such as a power op-amp, a resistor (R), and a capacitor (C).

Figure 4:
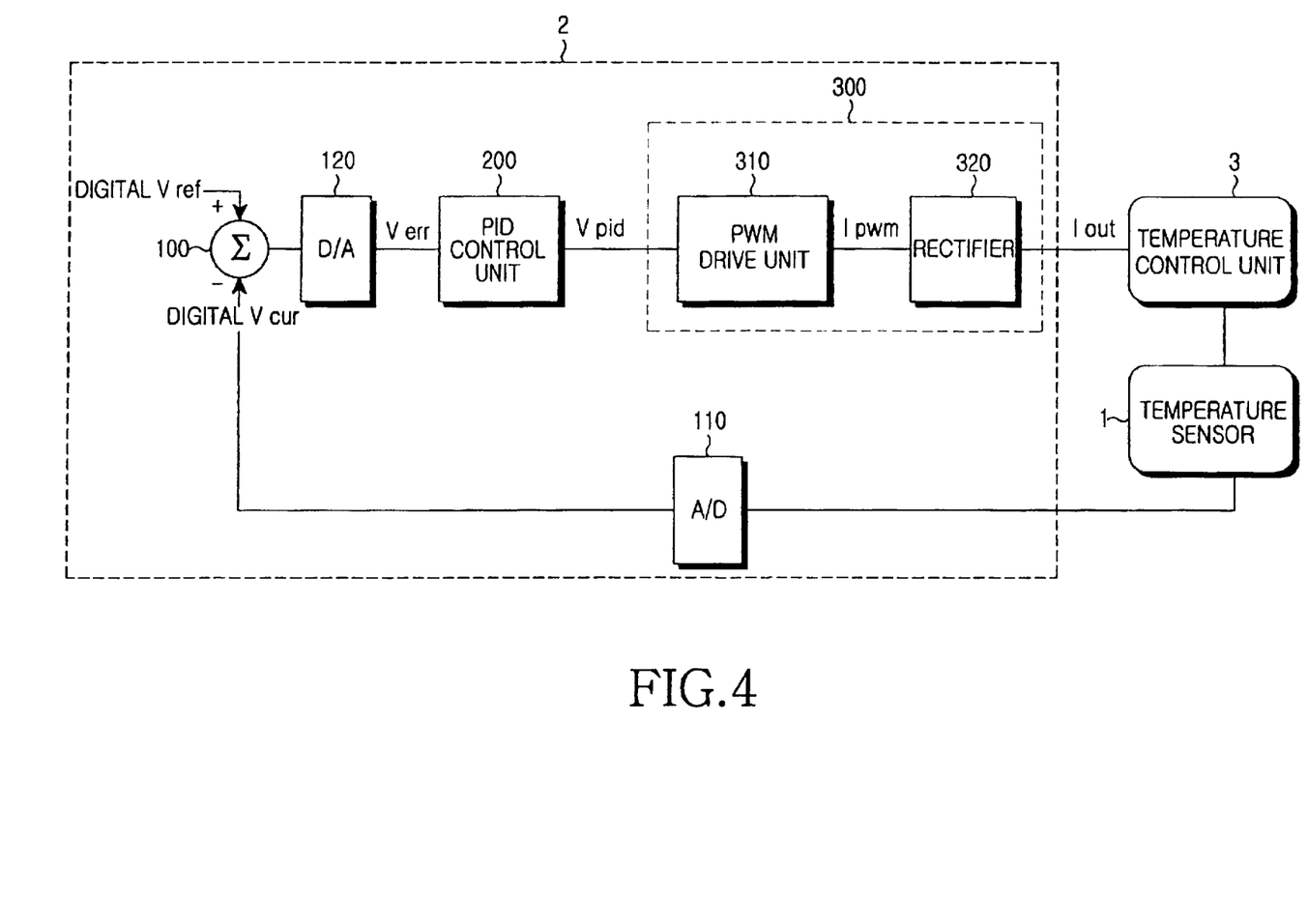
FIG. 4 is a block diagram illustrating the construction of a low heat-generating temperature compensation device in accordance with an embodiment of the present invention, in which the temperature comparison unit is subjected to digital signal processing.

FIG. 4 is a block diagram illustrating an exemplary low heat-generating temperature compensation device in accordance with a preferred embodiment of the present invention, in which the temperature comparison is subjected to digital signal processing.

As illustrated in FIG. 4, the low heat-generating temperature compensation device in accordance with the present invention comprises a temperature sensor 1, a temperature compensation module 2, and a temperature control unit 3, wherein the temperature compensation module 2 consists of a temperature comparison unit 100, a PID control unit 200, a high electric current drive unit 300, an A/D converter 110, and an D/A converter 120.

The temperature sensor 1 detects the current temperature of an optical communication device or the like; a voltage signal corresponding to the detected temperature is converted into a digital signal through the A/D converter 110. The temperature comparison unit 100 calculates a digital error voltage value $V_{err}$ which is the difference between the voltage value $V_{cur}$, which corresponds to the current temperature and has been converted into a digital signal through the A/D converter, and a reference voltage value $V_{ref}$, which corresponds to a set temperature. A voltage divider circuit is the type generally used as a circuit for measuring the voltage value corresponding to the current temperature, in which case a closed loop consists of a reference voltage (3V), a resistor, a temperature sensor and a ground (GND), in this sequence.

Advantageously, through digital signal processing, digital $V_{ref}$ and/or digital $V_{cur}$ are manipulated to compensate for the type of temperature sensor employed. If, for example, a thermistor is used as the temperature sensor, the resistance value of the temperature sensor decreases with increase in temperature and thus the voltage value $V_{cur}$ of the current temperature also tends to decrease. Therefore, $V_{cur}$ is increased to yield digital $V_{cur}$, or $V_{ref}$ is decreased to yield digital $V_{ref}$, or both digital values are partially adjusted. If, on the other hand, an RTD is used as the temperature sensor, the resistance value of the temperature increases with an increase in temperature and thus the voltage value $V_{cur}$ of the current temperature tends to increase; accordingly, $V_{cur}$ is decreased to yield digital $V_{cur}$, or $V_{ref}$ is increased to yield digital $V_{ref}$, or both digital values are partially adjusted. Since the temperature comparison unit 100 compares error voltage values in digital values, it is possible to implement the temperature comparison unit in a PCB to accommodate sensors regardless of their types.

The digital error voltage value is inputted into the PID control unit 200 after conversion into an analog voltage value $V_{err}$ through the D/A converter 120. The PID control unit generates a temperature compensation signal $V_{pid}$ by executing PID control function to regulate the error voltage value to zero. That is and as described in further detail below, through feedback the PID control function brings or "urges" the error voltage value to zero.

$V_{pid}$ is amplified in the high electric current drive unit 300 and supplied to the temperature control unit 3, which controls the temperature of the optical communication device with the supplied electric current. In the embodiment shown, the high electric current drive unit 300 consists of a PWM driver 310 and a current rectifier circuit 320. The PWM driver 310 has a low output resistance and a high thermal efficiency and therefore does not require a separate heat sink. For this reason, it is used mainly for devices which generates low heat.

Figure 5:
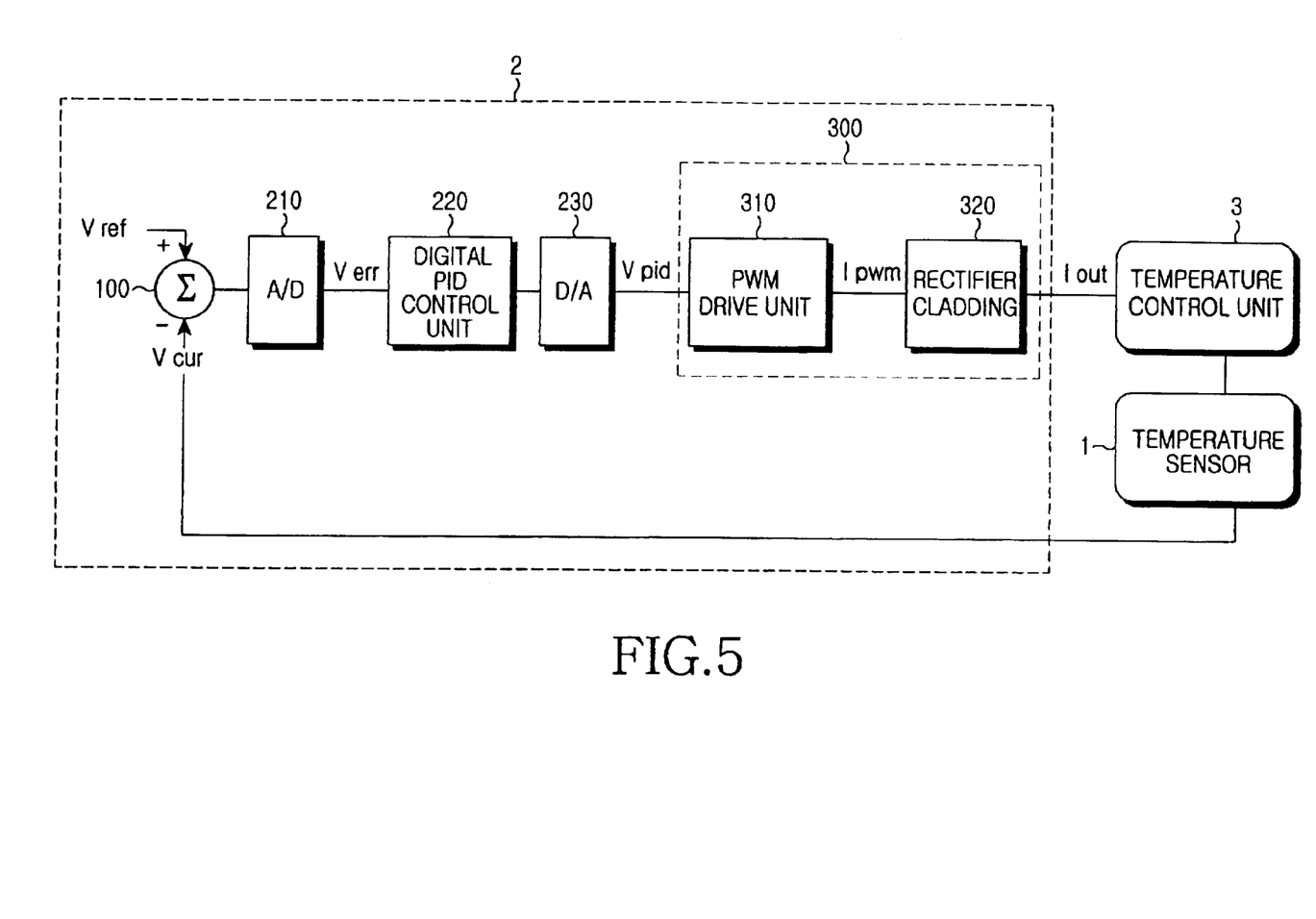
FIG. 5 is a block diagram illustrating the construction of a low heat-generating temperature compensation device in accordance with an embodiment of the present invention, which comprises a digital temperature comparison unit and a digital PID controller.

FIG. 5 diagrammatically illustrates an example of another preferred embodiment of the present invention, in which the low heat-generating temperature compensation comprises a digital PID controller.

As shown in FIG. 5, the low heat-generating temperature compensation device comprises: a temperature sensor 1; a temperature compensation module 2 which consists of a temperature comparison unit 100, a digital PID control unit 220, a high electric current drive unit 300, an A/D converter 210, and a D/A converter 230; and a temperature control unit 3.

The construction of this embodiment is different from that shown in FIG. 1 in that the former comprises the digital PID control unit 220 instead of the analog PID control unit 20. This embodiment further comprises the A/D converter 210 and the D/A converter 230 at the input and output terminals of the digital PID control unit 220, respectively, in order to perform PID control.

The temperature comparison unit 100 calculates an error voltage value which is the difference between a voltage value corresponding to the current temperature and a voltage value corresponding to the reference temperature. The error voltage value is converted to a digital voltage value by the A/D converter 210 and inputted into the digital PID control unit 220.

The digital control unit 220 performs digital PID control in a way that urges the error voltage value to zero. The PID control is executed through a universal microprocessor, in which the basic formula for PID control of digital PID sampling mode is as follows:

Control amount = $K_p$ × error (Proportion P) +

$K_i$ × error accumulation (Integration I) +

$K_d$ × difference from the last error (Derivation D)

This is expressed symbolically as follows:

$nV_{pid} = (n-1)V_{pid} + D_n V_{pid}$ $D_n V_{pid} = K_p \times (nV_{err} - (n-1)V_{err}) +$ $K_i \times nV_{err} +$ $K_d \times ((nV_{err} - (n-1)V_{err}) - ((n-1)V_{err} - (n-2)V_{err}))$ In the above formula, $nV_{pid}$ and $(n-1)V_{pid}$ indicate last control amount and current control amount, respectively, $D_n V_{pid}$ means derivation of current control amount, and $nV_{err}$, $(n-1)V_{err}$ and $(n-2)V_{err}$ indicate current error, last error and error preceding the last, respectively. $K_p$, $K_i$ and $K_d$ mean proportion constant, integration constant and derivation constant, respectively.

The output value of the digital PID control unit 220 is converted into an analog value through the D/A converter 230. The analog value is supplied as high electric current to the temperature control device 3, which may be a heater or a TEC, through the high electric current drive unit 300, which consists of a PWM driver 310 and a current rectifier 320. The temperature control unit 3 maintains the current temperature close to the reference temperature based on a signal from the high electric current drive 300. The digital PID control uses, as required, P control, PI control, PD control, PID control, etc.

Figure 6:
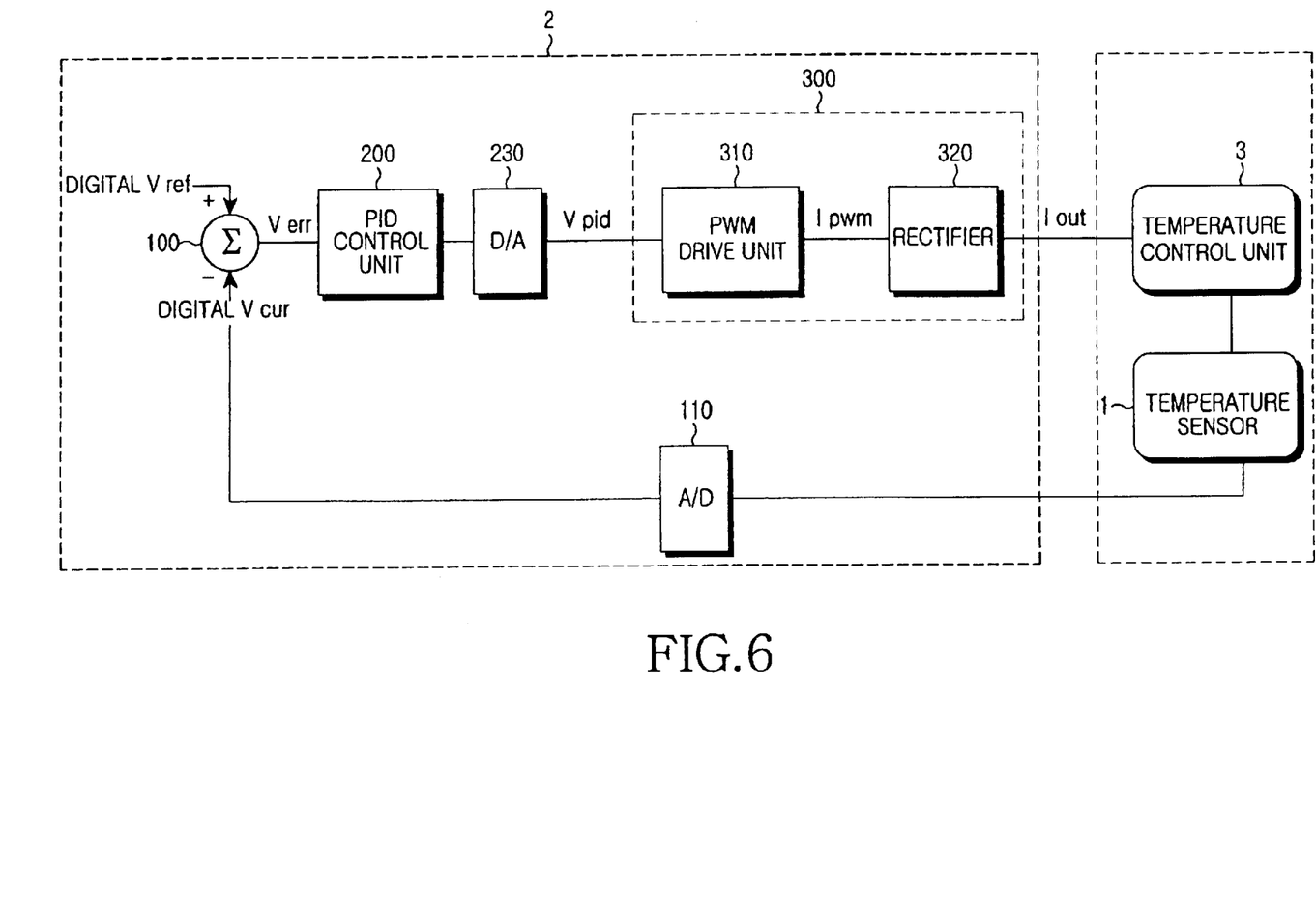
FIG. 6 is a block diagram of another embodiment of the present invention, in which the low heat-generating temperature compensation device comprises a digital temperature comparison unit and a digital PID controller.

FIG. 6 shows another exemplary and preferred embodiment of the present invention, in which the low heat-generating temperature compensation device comprises a digital temperature comparison unit and a digital PID controller.

As shown in FIG. 6, the low heat-generating temperature compensation device according to this embodiment comprises a temperature sensor 1; a temperature compensation module 2 which consists of a temperature comparison unit 100, a digital PID control unit 220, a high electric current drive unit 300, an A/D converter 110, and a D/A converter 230; and a temperature control unit 3.

The construction of this embodiment is different from that shown in FIG. 1 in that the former comprises the digital PID control unit 220 instead of the analog PID control unit 20. This embodiment further comprises the D/A converter 230 at the output terminal of the digital PID control unit 220 in order to perform PID control.

The voltage value of current temperature, which is detected by the temperature sensor 1, is converted into a digital voltage value, digital $V_{cur}$, through the A/D converter 110. The temperature comparison unit 100 calculates an error voltage value $V_{err}$, which is the difference between the voltage of the reference temperature, digital $V_{ref}$, and the voltage of the current temperature, digital $V_{cur}$. The error voltage value $V_{err}$ is inputted into the digital PID control unit 200, which performs PID control via a universal micro controller in a method as described above. The PID output value from the digital PID controller is converted into an analog value and then supplied as high electric current to the temperature control unit 3 through a PWM driver 310 and a current rectifier 320. As a result, a low heat-generating temperature compensation device is constructed which constantly maintains the reference temperature and the current temperature.

Figure 7:
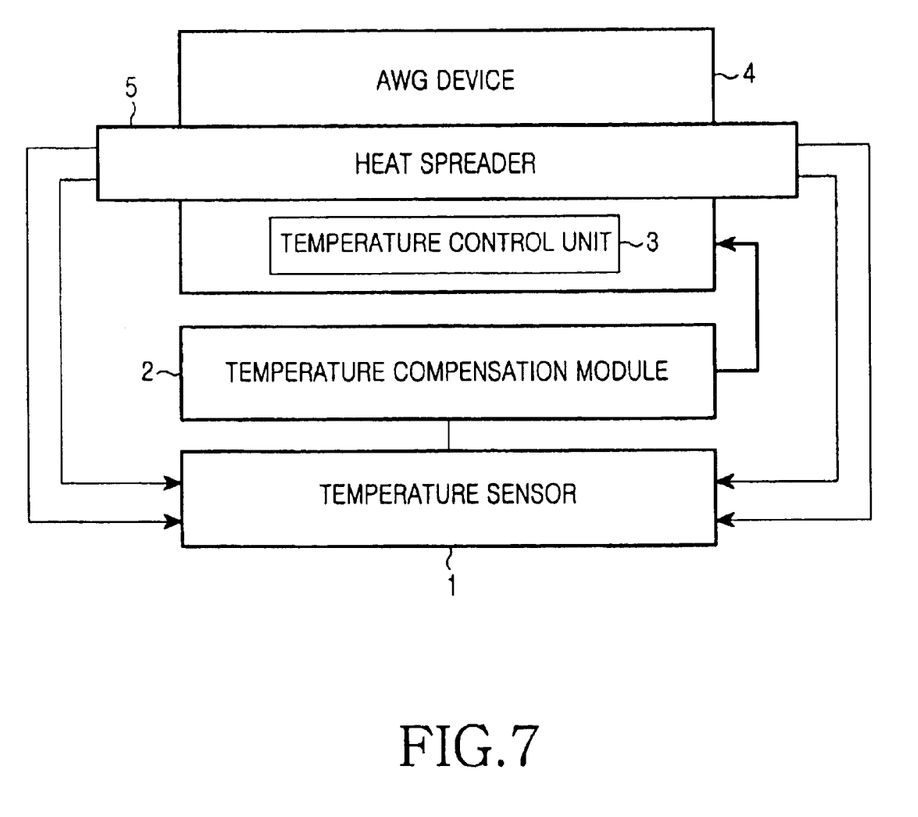
FIG. 7 is a flow diagram of a process for applying a low heat-generating temperature compensation device of the present invention to a WDM Mux/DeMux type AWG device in order to stabilize the temperature characteristic of the AWG.

FIG. 7 shows, by way of example, a process for applying a low heat-generating temperature compensation device of the present invention to an AWG device that is a WDM Mux/DeMux device in order to stabilize the temperature characteristic of the AWG A temperature sensor 1 detects the currently used temperature of the AWG device 4. If the detected temperature deviates from a reference temperature, a temperature compensation module 2 supplies a control signal to a temperature control unit to compensate for the deviation in operating a temperature controlled device such as a heater or a TEC. The AWG device 4 therefore maintains a constant temperature (reference temperature) characteristic regardless of the environmental temperature. A heat spreader 5 evenly transfers the heat to the AWG device 4 without bias.

As described above, the low heat-generating temperature compensation device comprises a temperature comparison unit and an analog PID control unit that are constructed to perform digital signal processing. As a result, the present invention can reduce the number of electric parts and concomitant material costs and miniaturize the modular size of the temperature compensation device.

Furthermore, due to the digital signal processing of the temperature comparison, it is possible to construct an universal low heat-generating temperature compensation device that can accept various types of temperature sensors while using only one PCB.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A low heat-generating temperature compensation device that allows an optical communication device to have a constant temperature characteristic regardless of change of environmental temperature, the low heat-generating temperature compensation device comprising:

a temperature sensor that detects a temperature at which the optical communication device is used;

a temperature comparison unit that performs digital signal processing of a signal corresponding to the detected temperature and a signal corresponding to a reference temperature of the optical communication device and then generates a digital error value which represents the difference between the two signals;

a D/A converter that converts the digital error value of the temperature comparison unit into an analog signal;

a temperature control unit that controls the temperature of the optical communication device on the basis of a temperature compensation signal;

an analog PID control unit that receives the analog signal and performs PID control using an analog method to generate the temperature compensation signal so as to urge the digital error value to zero; and a high electric current drive unit, consists of a pulse width modulation driver and a current rectifier, for receiving the temperature compensation signal from the analog PID control unit, amplifying the temperature compensation signal and supplying the temperature compensation signal as high electric current to the temperature control unit.

2. The low heat-generating temperature compensation device according claim 1, wherein said two signals each comprise a voltage signal.

3. A low heat-generating temperature compensation device that allows an optical communication device to have a constant temperature characteristic regardless of change of environmental temperature, the low heat-generating temperature compensation device comprising:

a temperature sensor that detects a temperature at which the optical communication device is used;

a temperature comparison unit that generates an error value which represents the difference between a signal corresponding to the detected temperature and a signal corresponding to a reference temperature of the optical communication device;

an A/D converter that converts the error value of the temperature comparison unit into a digital error value;

a temperature control unit which controls the temperature of the optical communication device on the basis of an analog temperature compensation signal;

a D/A converter that converts a digital temperature compensation signal into the analog temperature compensation signal;

a digital PID control unit that performs PID control using a digital method to generate the digital temperature compensation signal in such a way that the digital error value is urged to zero; and a high electric current drive unit, consists of a pulse width modulation driver and a current rectifier, for receiving the analog temperature compensation signal from the D/A converter, amplifying the temperature compensation signal and supplying the analog temperature compensation signal as high electric current to the temperature control unit.

4. The low heat-generating temperature compensation device according to claim 3, wherein said two signals each comprise a voltage signal.

5. A low heat-generating temperature compensation device, which allows an optical communication device to have a constant temperature characteristic regardless of change of environmental temperature, the low heat-generating temperature compensation device comprising:

a temperature sensor that detects a temperature at which the optical communication device is used;

a temperature comparison unit that generates a digital error value which represents the difference between a signal corresponding to the detected temperature and a signal corresponding to a reference temperature of the optical communication device;

a temperature control unit that controls the temperature of the optical communication device on the basis of an analog temperature compensation signal;

a D/A converter that converts a digital temperature compensation signal into the analog signal;

a digital PID control unit that receives the digital error value and performs PID control using an digital method to generate the digital temperature compensation signal so as to urge the digital error value to zero;

a high electric current drive unit, consists of a pulse width modulation driver and a current rectifier, for receiving the analog temperature compensation signal from the D/A converter, amplifying the temperature compensation signal and supplying the analog temperature compensation signal as high electric current to the temperature control unit.

6. The low heat-generating temperature compensation device according claim 5, wherein said two signals each comprise a voltage signal.

7. A low heat-generating temperature compensation method that allows an optical communication device to have a constant temperature characteristic regardless of change of environmental temperature, the low heat-generating temperature compensation method comprising the steps of:

detecting a temperature at which the optical communication device is used, and performing digital signal processing of a signal corresponding to the detected temperature and a signal corresponding to a reference temperature of the optical communication device and then generating a digital error value which represents the difference between the two signals;

D/A converting the digital error value of the temperature comparison unit into an analog signal;

performing temperature compensation of the optical communication device in an analog method on the basis of a temperature compensation signal;

performing PID control using an analog method to generate the temperature compensation signal so as to urge the digital error value to zero;

receiving the temperature compensation signal;

amplifying the temperature compensation signal using pulse width modulation and current rectification; and supplying, as high electric current, the temperature compensation signal upon which basis the temperature compensation is performed using pulse width modulation and current rectification.

8. The low heat-generating temperature compensation method according to claim 7, wherein the step of generating a digital error value consists of:

detecting a temperature at which the optical communication device is used and calculating an error voltage value which is the difference between a voltage signal corresponding to the detected temperature and a voltage signal corresponding to the reference temperature of the optical communication device; and A/D converting the error voltage value and performing digital signal processing of the error voltage value.

9. The low heat-generating temperature compensation method according claim 7, wherein said two signals each comprise a voltage signal.

10. A low heat-generating temperature compensation method, which allows an optical communication device to have a constant temperature characteristic regardless of change of environmental temperature, the low heat-generating temperature compensation method comprising the steps of:

detecting a temperature at which the optical communication device is used and performing digital signal processing of a signal corresponding to the detected temperature and a signal corresponding to a reference temperature of the optical communication device and then generating a digital error value which represents the difference between the two signals;

A/D converting the error value of the temperature comparison unit into a digital signal;

performing temperature compensation of the optical communication device using an analog method on the basis of an analog temperature compensation signal;

D/A converting a digital temperature compensation signal to generate the analog temperature compensation signal;

performing PDI control using a digital method to generate the digital temperature compensation signal in such a way that the digital error value is urged to zero;

receiving the temperature compensation signal;

amplifying the temperature compensation signal using pulse width modulation and current rectification; and supplying, as high electric current, the temperature compensation signal upon which basis the temperature compensation is performed using pulse width modulation and current rectification.

11. The low heat-generating temperature compensation method according claim 10, wherein said two signals each comprise a voltage signal.

\* \* \* \* \*